US007695202B1

(12) United States Patent  (10) Patent No.: US 7,695,202 B1
Brubacher  (45) Date of Patent: Apr. 13, 2010

(54) VISUAL LASER DIODE TO FIBER COUPLING SYSTEM

(76) Inventor: Michael Brubacher, 6222 E. Janice Way, Scottsdale, AZ (US) 85254

( * ) Notice: Subject to any disclaimer, the term of this patent is extended or adjusted under 35 U.S.C. 154(b) by 52 days.

(21) Appl. No.: 12/220,049

(22) Filed: Jul. 21, 2008

(51) Int. Cl.
    *G02B 6/36* (2006.01)
(52) U.S. Cl. .......................... 385/93; 385/92; 385/139; 385/88
(58) Field of Classification Search ............ 385/92–93, 385/138–139
    See application file for complete search history.

(56) References Cited

U.S. PATENT DOCUMENTS

| | | | |
|---|---|---|---|
| 4,030,811 | A | 6/1977 | Khoe et al. |
| 5,195,155 | A | 3/1993 | Shimaoka et al. |
| 5,618,099 | A | 4/1997 | Brubacher |
| 5,673,350 | A | 9/1997 | Song et al. |
| 5,720,664 | A | 2/1998 | Brubacher |
| 6,516,130 | B1 | 2/2003 | Jang |
| 6,951,508 | B1 | 10/2005 | Brubacher |
| 7,194,016 | B2 | 3/2007 | Bullington et al. |
| 2006/0215724 | A1* | 9/2006 | Sesko ........................ 372/107 |
| 2007/0167113 | A1* | 7/2007 | Klein et al. ..................... 451/6 |

FOREIGN PATENT DOCUMENTS

CA    2574702    7/2007

OTHER PUBLICATIONS

Gradient Index Lenses Information on GlogalSpec—3 pgs.
Optics Letters / vol. 27, No. 20 / Oct. 15, 2002—3 pgs.
Newport Corporation—Manual Positioning—Manual-Fiber-Alignment www.newport.com—3 pgs.
Photonics and Instrumentaion—GRIN Lens Fiber Couplers—1 pg.
OZOptics—www.ozoptics.com—Feb. 9, 2006—4 pgs.
ARC Electronics—Fiber Optics—The Basics of Fiber Optic Cable—Tutorial—12 pgs.

* cited by examiner

*Primary Examiner*—Frank G Font
*Assistant Examiner*—Eric Wong
(74) *Attorney, Agent, or Firm*—Gregory J. Nelson

(57) ABSTRACT

A housing for mounting a laser diode and a method of aligning the laser diode to the housing and to an optical connector and to a focusing lens. The housing may have a retaining device and a surface, with the retaining device operating to maintain the optical connector against the surface of the housing. An alignment method is disclosed for use with the housing and the retaining device where an image is projected onto a viewing area through an alignment port mounted in the housing. The image relates to the position and tilt of the laser diode in the housing.

22 Claims, 7 Drawing Sheets

VISUAL LASER DIODE TO FIBER COUPLING SYSTEM

BACKGROUND

1. Technical Field

This disclosure relates to alignment devices and methods for aligning light sources to optical connectors.

2. Background Art

The process of efficiently coupling laser light into a common plastic, glass or other optical fiber is a difficult task due to the small size of the components involved. Both the active area of the laser diode and the core area of the fiber are typically measured in single or double digit microns. Alignment errors of only a few microns can result in unacceptable loss of optical power. Perhaps the most common means of coupling laser light into a fiber is to actually weld the fiber directly to the active area of the laser diode thereby creating a fiber optically pigtailed laser diode. This is a painstaking and expensive process that is usually not reversible so that if either component fails both components can be lost. As an alternative, specially designed optics and housings offer advantages in the laser to fiber coupling process but those systems currently available have distinct economic and utilitarian limitations. Most of these alternatives require the use of some sort of electronic optical meter to measure the amount of light passing into and then out of the fiber. When the operator has determined, via this "hunt and peck" method that a maximum reading has been achieved the light source, lens if any, and fiber are deemed "aligned". A process, utilizing simple and inexpensive fixtures that incorporate several useful and intuitive features for the user and that do not require any special instrumentation would be of great benefit to manufacturers of fiber coupled laser diodes.

BRIEF SUMMARY

Disclosed is an alignment device and method which allows a laser diode to be aligned to a lens and alignment port independent of a fiber optic cable. The optical coupling process may be achieved by using the human eye as the determinant for alignment. Once the alignment port is removed from the diode/lens fixture, a fiber optic cable assembly may be inserted with little or no further alignment necessary. The fiber optic cable can then be secured or removed without loss of the alignment between the laser diode and the lens. Further the fiber optic may be inserted and aligned to the lens with a simple mechanism. The laser diode may be aligned to the lens by inserting an alignment port into the position where a ferrule containing an optical fiber would be placed when in use. The alignment process allows a bright image of the laser light to be projected onto a surface or screen, and reflected light to also be projected on to the surface or screen. This image can be typically discerned by the un-aided human eye if a light source emitting in a visible wavelength is being utilized. The projected images may serve as feed back for aligning the relative positions of the laser diode and the housing so that the laser is aligned to the lens, and to the position where a ferrule with an optical cable will be inserted. The embodiments of the alignment apparatus and methods disclosed may be used in various settings, and with various modifications.

As will be made clear, the disclosed embodiments of the alignment apparatus provide advantages in aligning laser diodes to a lens or an optical connector, as well as other advancements in the art.

BRIEF DESCRIPTION OF THE DRAWINGS

The above and other advantages and objects of the present invention will become more apparent from the following description, claims and drawings in which:

DETAILED DESCRIPTION OF THE DRAWINGS

The following is a description of an example embodiment of an alignment apparatus and a method of alignment.

Figure 1:
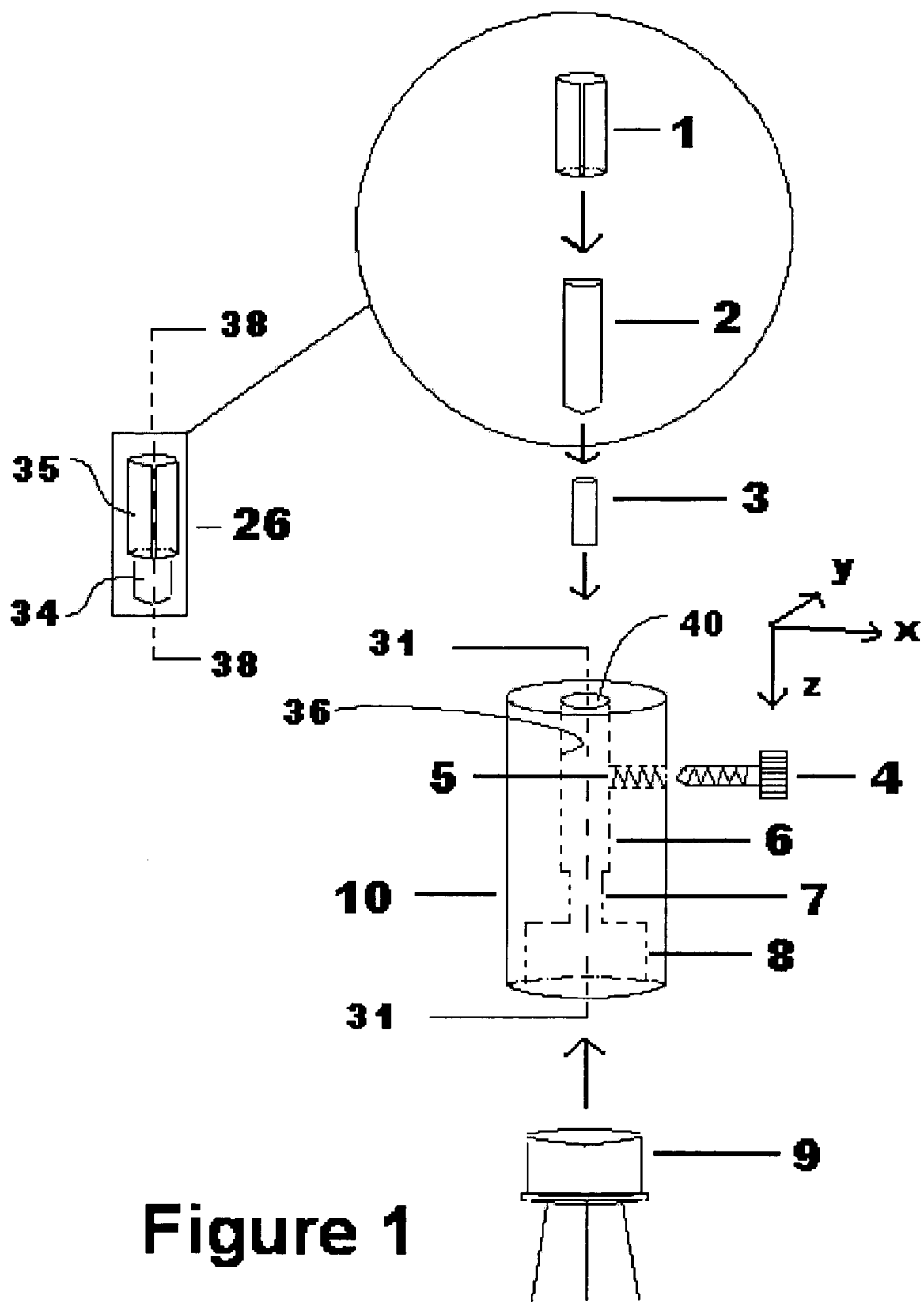
FIG. 1 is a perspective view of components of an embodiment of an alignment apparatus.

An example embodiment of an alignment apparatus is shown in FIG. 1. FIG. 1 is a perspective view indicating how each optical element fits into a housing 10. Adjustable retainer 1 fits over ferrule 2 forming sub-assembly alignment port 26. Ferrule 2 may be of standard manufacture and design as shown in this drawing, and may be, for example, a 2.5 mm diameter stainless steel optical ferrule available through many fiber optic supply houses. A retaining device 4 may be a thumb screw and a threaded opening 5 to secure alignment port 26 in position. Focusing lens 3 may be secured in lens cavity 7 by some means with adhesive means being one method, and mechanical means being another method. light source 9 may be a laser diode or other light source of separate manufacture and may be any of several different sizes and wavelengths. For example other light sources may include incandescent light source, and light sources emitting white light, ultraviolet light, deep ultraviolet light, and other light sources which may be connected to an optical fiber. An opening at the proximal end of the housing 8 for the laser diode 9 may be slightly larger than laser diode 9 allowing movement in at least one of an X axis; Y axis, and tilt relative to the light Source 9. Light source 9 may be secured to the housing 10, during and after the alignment process, by some means with adhesive means being one possibility. The housing 10 may have a cavity as in the current example for receiving the light source. The cavity may serve as a course alignment of the laser diode or light source in at least one of the "x" and "y" and tilt positions, with the sides of the cavity serving to limit the "x" and "y" positions. The housing may alternatively have a section for a laser diode or other light source which is not a cavity, but has other structure for aligning the light source or laser diode in a course alignment so that a precise alignment may take place according to an embodiment of the invention.

Once the housing 10 and the light source 9 are secured together they may be provided as a unit for use with a fiber optic cable having a standard ferrule based optical connector. For the purpose of this disclosure, an optical connector may be any connector used on the end of an optical cable to support the optical fiber for connection with an optical component or another optical cable, including a ferrule based optical connector.

Figure 2:
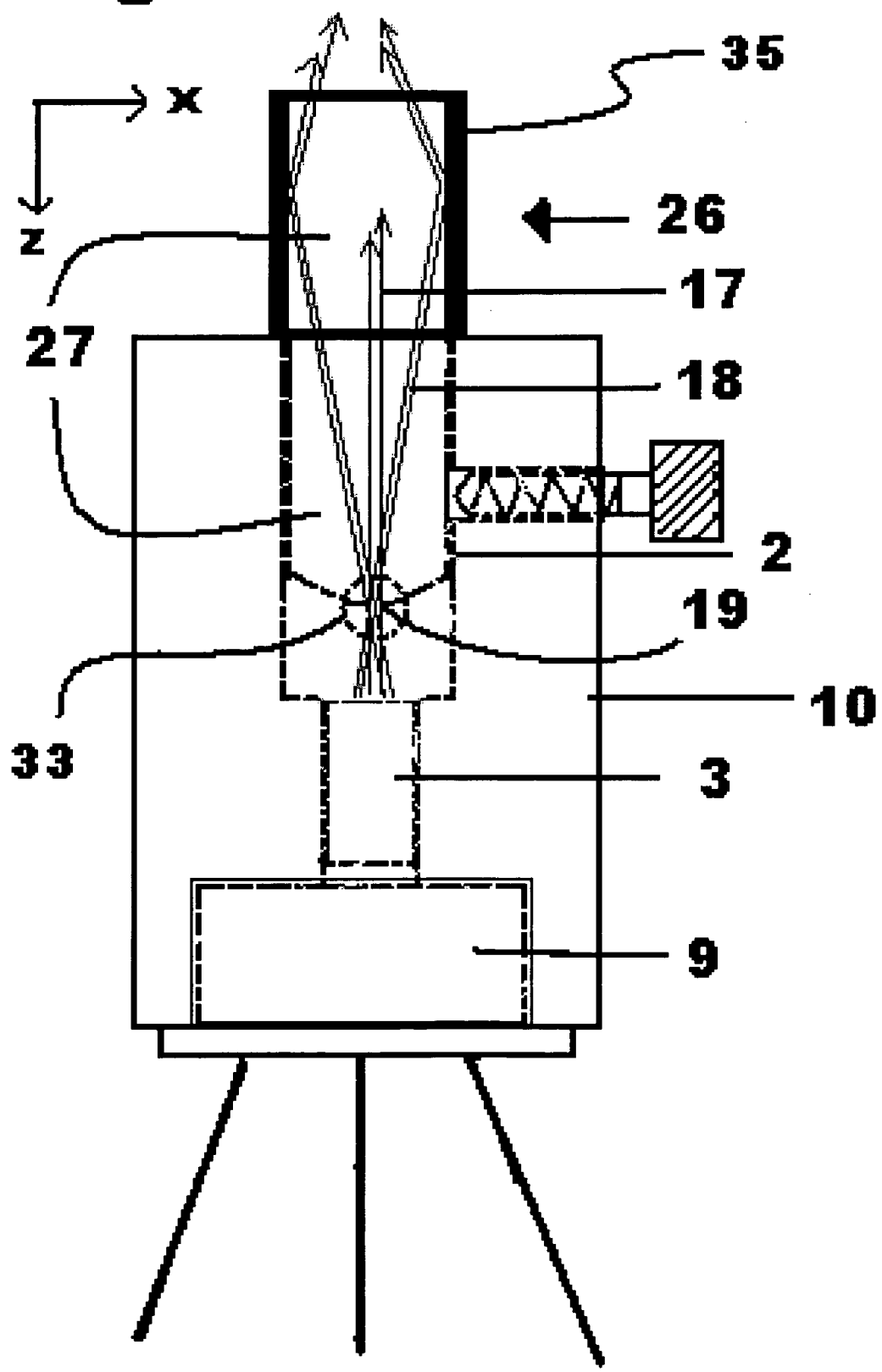
FIG. 2 is a side view of an embodiment of an alignment apparatus according to an embodiment of the invention.
Figure 8:
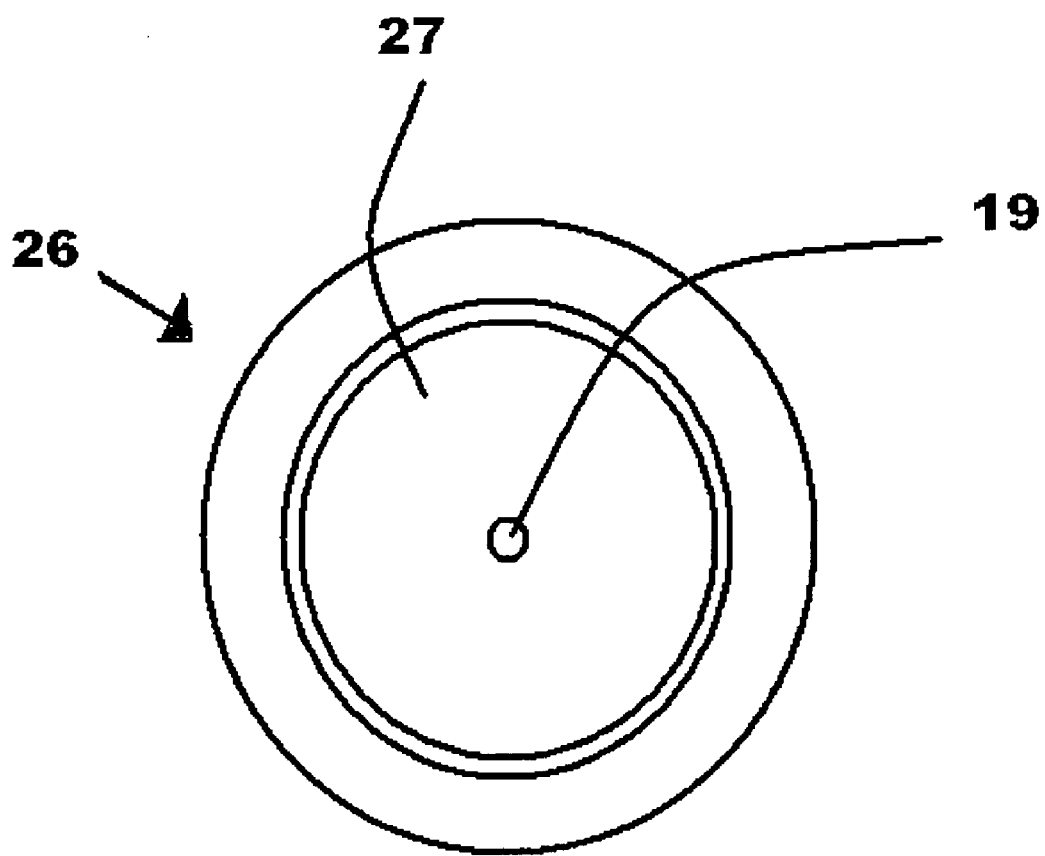
FIG. 8 is a top view of an alignment port according to an embodiment of the invention.

FIG. 2 shows the components in their place and ready for alignment. Light emitted by the diode 9 is focused by the lens 3 and is shown entering the alignment port 26 at the aperture 19. The focused light may have both an imaged light 17 and a reflected light 18 component. The interior of the alignment port 26 may be a reflective chamber 27 which allows some of the light to be reflected off of the interior sides of the alignment port. For example, FIG. 2 shows an example alignment port with reflected light 18 reflecting off of the interior of the reflective chamber 27 in the alignment port 26 which is in the housing 10. The example embodiment of the alignment port in FIGS. 1, 2 and 8 show that the alignment port 26 has a reflective chamber 27 on the interior, and an aperture 19. FIG. 8 shows a top view of an example alignment port 26 with the aperture 19 and the reflective chamber 27. In the example embodiment it can be seen that a cross section of the reflective chamber 27 is larger than a cross section of the aperture 19. The cross sections of the reflective chamber 27 and the cross section of the aperture 19 are viewed as perpendicular to the longitudinal axis of the alignment port 38-38. The aperture 19 may be an opening at one end of the alignment port 26 and the reflective chamber 27 may open to the opposite end of the alignment port 26. The aperture 19 may be smaller than the open end of the reflective chamber 27.

Figure 3:
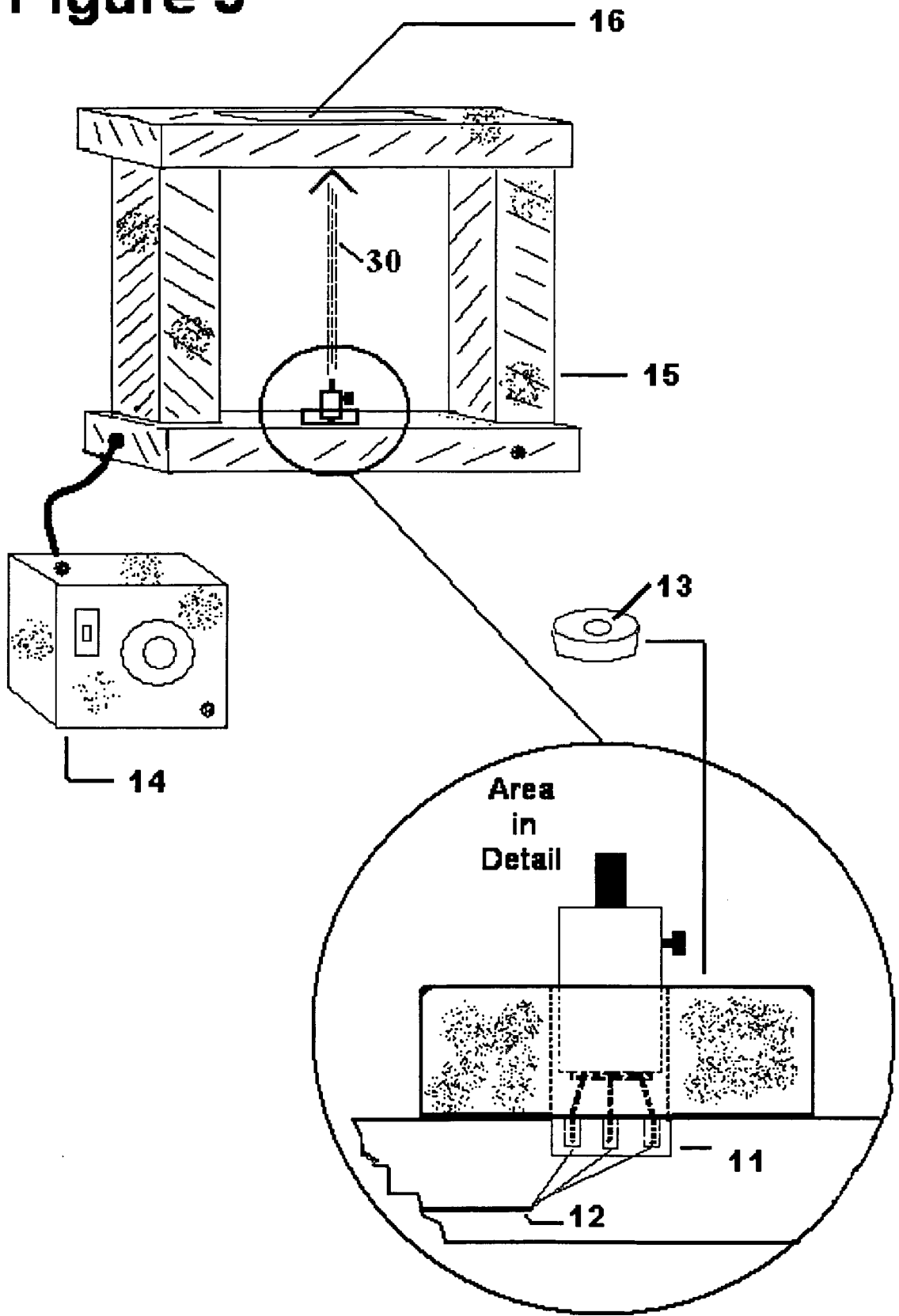
FIG. 3 is a perspective view of an alignment apparatus and fixture according to an embodiment of the invention.

FIG. 3 shows the example components shown in FIG. 2 electronically and mechanically connected to main fixture 15. Laser control box 14 provides the electronic control and power for the laser diode 9. Laser control box 14 could be made a part of main fixture 15 but for purposes of clarity is shown separately in this drawing. Projected light rays impinge on the bottom side of viewing area 16 which may be a translucent window. A portion of the light may be visible to the eye when looking down onto the opposite side of the viewing area 16. This description assumes that a laser diode emitting in the visible wavelength is being coupled. Light sources emitting in the infrared wavelength or other wavelength ranges may be aligned as well and the viewing area may include the use of an instrument capable of detecting in the infrared wavelength or other range of emission. The instrument could then display images made visible to the human eye.

Figure 4:
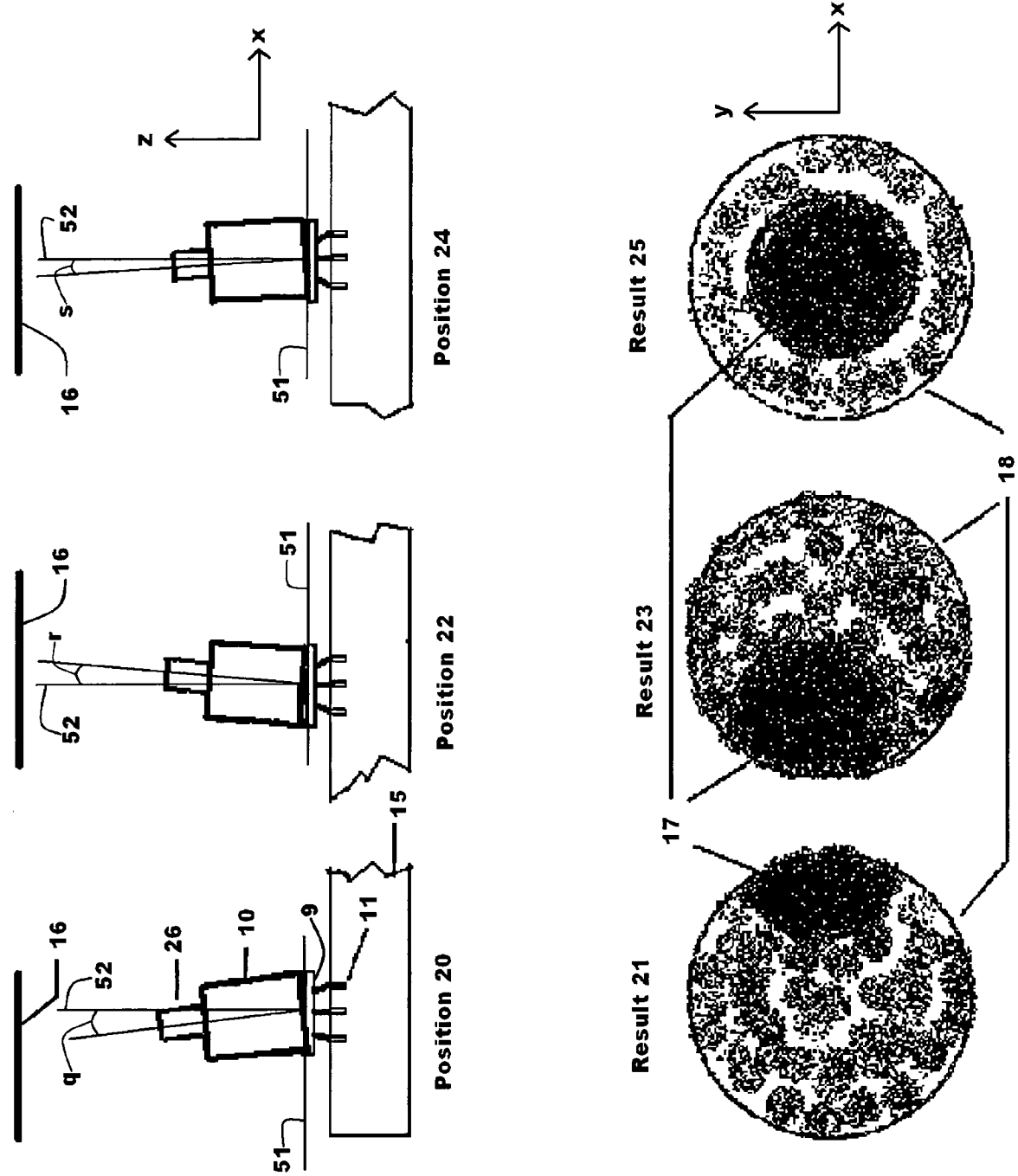
FIG. 4 shows views illustrating an alignment method according to an embodiment of the invention, with example projected images.
Figure 5:
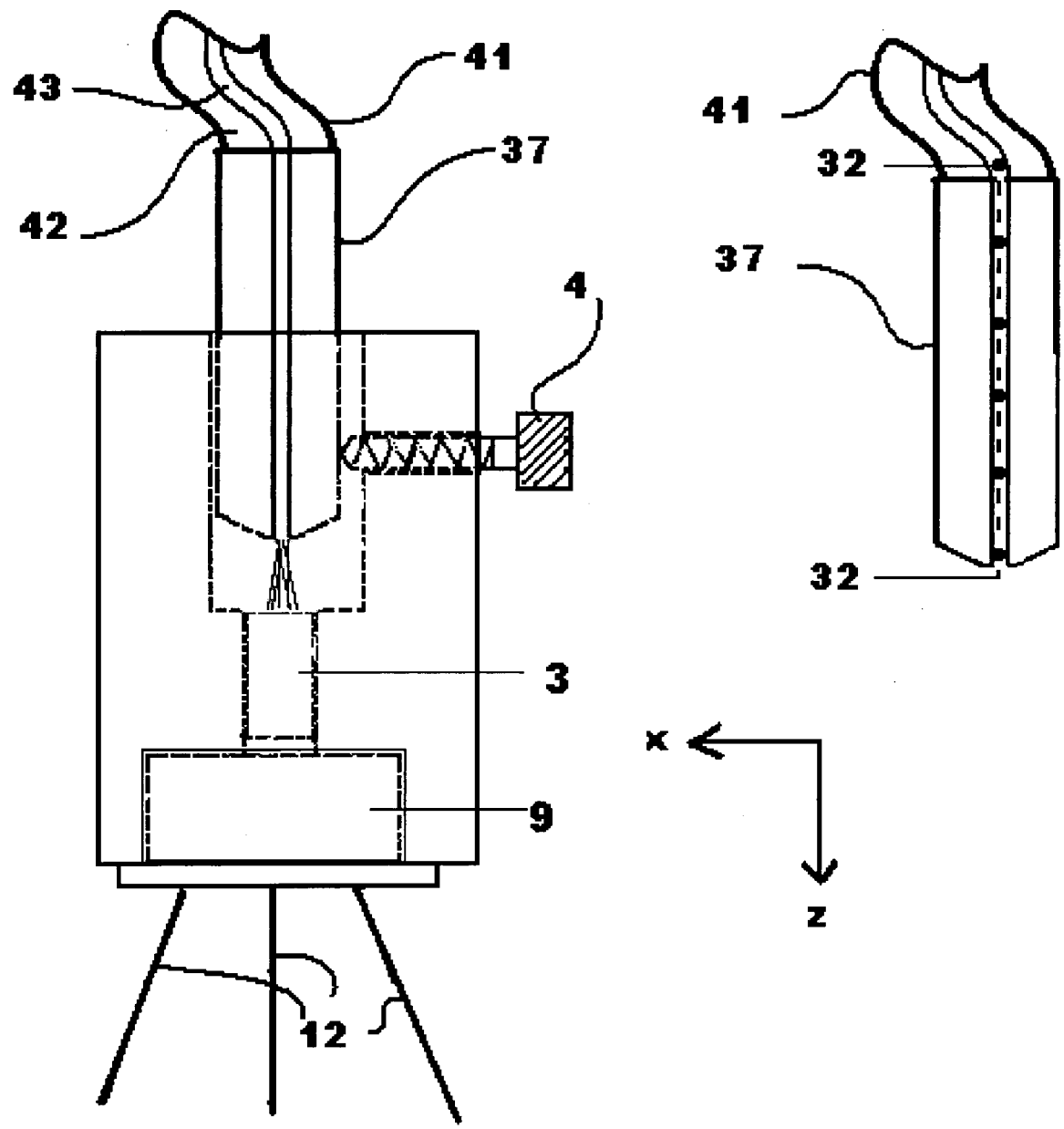
FIG. 5 is a side view of an embodiment of an alignment apparatus according to an embodiment of the invention.

FIG. 4 teaches how the housing 10 may be tilted manually (by hand) so that focused laser light enters the alignment port 26 at the aperture 19 allowing the light to pass through the alignment port and subsequently projected onto the viewing area 16. In this way the adjustment may be made by viewing the image on the viewing area to determine when the diode is properly aligned. The projected image at the viewing area 16 consists of two primary elements; an area of more intense light and an area of less intense light of which both are generally round in shape with the less intense area of light having a circumference greater than that of the more intense light area. Mechanical or automated means may also be employed for tilting and adjusting the position of the housing relative to the laser. The configuration of the more intense light relative to the less intense light may be used to determine when alignment is achieved. In the example embodiment the predetermined configuration of the more intense light is in the center of the less intense light. The projected image may indicate the quantity of light which is passing through the aperture. The projected image may also indicate the concentricity of the more intense light. It is likely that if the more intense light is concentrically aligned, a higher quantity of light will enter a fiber optic which is used with the housing according to an embodiment of the invention. Other predetermined configurations may be useful in aligning optical components.

The level line 51 is drawn to show the level of the laser diode 9. The projection line 52 is drawn to show a line perpendicular to the level line 51, and the direction in which light may be projected from the laser diode 9 without the housing 10. Position 20 is shown with the alignment port 26 secured in the housing 10, and with the angle "q" which is measured from the projection line 52. The result of the tilt of the housing 10 relative to the laser diode 9 from Position 20 is shown in Result 21, with the image on the viewing area 16. At first, only less intense light and no more intense light may be apparent but as the housing 10 is tilted forward and back and side to side the more intense light may appear as demonstrated with Position 20 and Result 21. Once some portion of the more intense light is located, it may become intuitive to the practiced operator to tilt the housing 10 relative to the laser diode 9 in the correct direction as demonstrated by Position 22 so that the relative tilt of the housing 10 with respect to the laser diode 9 has an angle "r" from the projection line 52. The result of the tilt of the housing 10 relative to the laser diode 9 from Position 22 is shown in Result 23, with the image on the viewing area 16. As demonstrated by Result 23 we can see that the housing 10 was tilted in the correct direction but tilted too much. Position 24 with Result 25 demonstrates and example image on the viewing area 16 when the correct amount and direction of tilt is applied.

In this example embodiment, the alignment is achieved when the more intense light is concentrically aligned as shown in Result 25. This can result in a high quantity of light entering the alignment port, and into an optical connector when the alignment port is replaced with an optical connector. Then the desired alignment is achieved, with the housing having a relative tilt with respect to the laser diode shown as an angle "s". The adjustment of the relative position of the housing 10 with respect to the laser diode 9 (or other light source) may have a component of adjustment in the "x" and "y" directions, and may also have a component of tilt. For example, although FIG. 4 shows the angles "q", "r", and "s" as only represented in a tilt with an "x" directional component, it is expected that the tilt would be adjusted with direction in both "x" and "y". The adjustment of the relative position of the housing and the laser diode may also have a "z" component.

The housing shown is shown by way of example. Other structures may be formed to hold an alignment port 26, and to project light through the alignment port 26 onto a viewing area 16. The light source 9 such as a laser diode may be secured to the outside of the housing, or may be secured to an interior portion of the housing as shown in the example illustrations. The alignment port 26 may have a first end with an aperture 19. The first end with the aperture 19 may have a first outer portion of the alignment port 26, and may have a circumference approximately the same as the circumference of an optical connector designed to fit into the housing. The alignment port may have a second outer portion of the outer circumference at a second end which is larger than the opening at the distal end 40 of the housing 10.

In the example embodiment shown in the drawings, the adjustable retainer 1 is larger than the opening at the distal end 40 in the housing 10. The alignment port 26 may be used to align a light source 9, such as a laser diode, to a housing 10 and then the alignment port 26 may be removed and used on another housing module. The larger outer portion of the alignment port 26 may allow the aperture 19 in the alignment port 26 to be repeatably positioned relative to the lens 3, so that the aperture 19 is positioned approximately at the focal point 33 of the lens 3.

Multiple housings 10 each with a lens 3 may be made so that the focal point 33 of the lens is in a similar position from one housing to another housing. The alignment port 26 may have structures for repeatably positioning the alignment port with the aperture 19 approximately at the focal point 33 of the lens. In one example the depth or "z" orientation of the alignment port 26 may be positioned relative to the lens 3 by configuring an alignment port 26 with a first outer portion 34 that fits inside a housing, and a second outer portion 35 that does not fit into the housing 10. In this example the second outer portion 35 of the alignment port 26 may be any of different structure such as a ring, or one or more protrusions. Other configurations may be made where the "z" position relative to the lens is set by mechanical end stops or other similar means with the second outer portion 35 of the alignment port 26 contacting a portion of the housing 10, as show in the example embodiment of FIG. 2, which may be an outer portion of the housing or another structure connected to the housing.

Figure 7:
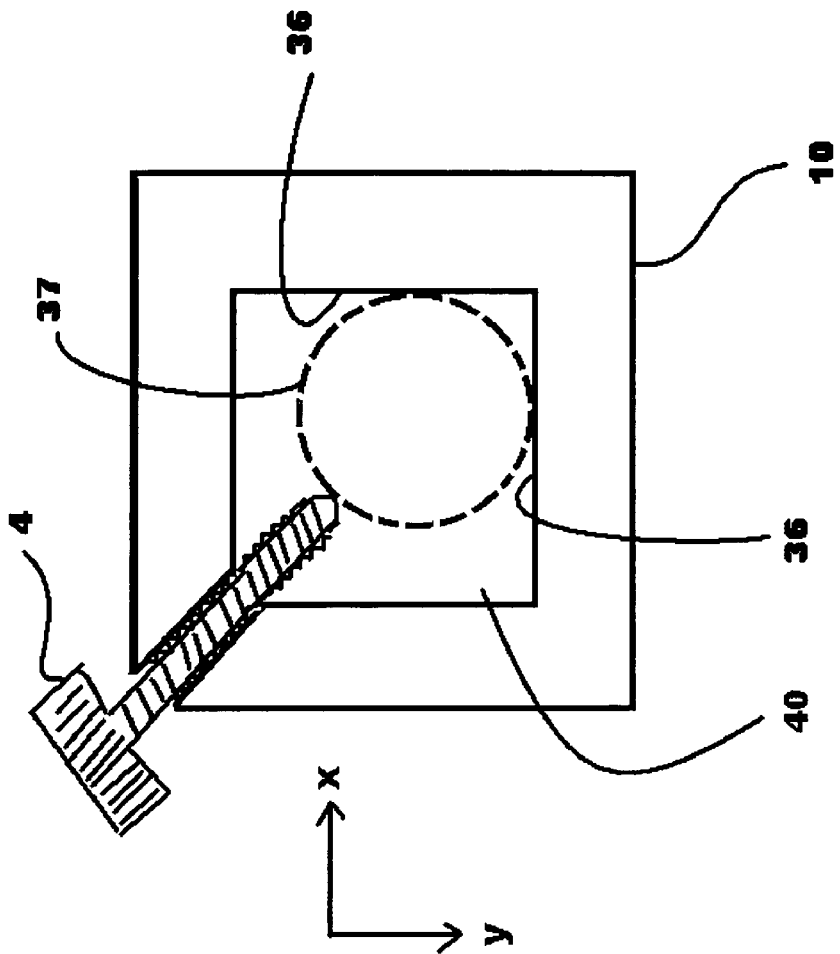
FIG. 7 is a top sectional view of an alignment apparatus according to an embodiment of the invention.

The "x", "y" and tilt of the alignment port 26 relative to the housing 10 may be repeatably positioned by using a retaining device 4 which forces and maintains the first outer portion 34 of the alignment port 26 against a surface 36 of the alignment housing. The surface 36 may be the rounded inner surface of a cylindrical opening for receiving the alignment port 26. Alternatively the surface 36 may be more than one surface as shown in FIG. 7. The retaining device may be any device known in the art or later developed for removably securing the alignment port or the optical connector in the housing.

The retaining device 4 may be a threaded thumb screw used with a threaded opening 5 in the housing 10. Alternatively the retaining device may be other mechanical structures, such as a cam device or spring loaded device which operate to force and maintain the alignment port 26 against a surface opposite the retaining device 4, so that the alignment port 26 is in contact with the surface along the length of the alignment port.

The housing 10 may have a longitudinal axis 31-31 and a surface 36 with the surface 36 being substantially parallel to the longitudinal axis 31-31. The retaining device 4 may be configured to press the alignment port 26 or the optical connector 37 against the surface 36 so that the longitudinal axis of the alignment port 38-38 when installed and secured in the housing 10 is in substantially the same position as the longitudinal axis of the optical connector 32-32 when installed and secured in the housing 10.

After the housing 10 is aligned with the light source 9 secured, the alignment port 26 may be removed and an optical connector 37 may be inserted into a similar position as the alignment port 26. The optical connector 37 may also have structures for setting the "z" position of the optical connector 37. The "z" position of the optical connector may alternatively be adjustable to provide attenuation of the light entering a fiber optic cable connected to the optical connector.

Figure 6:
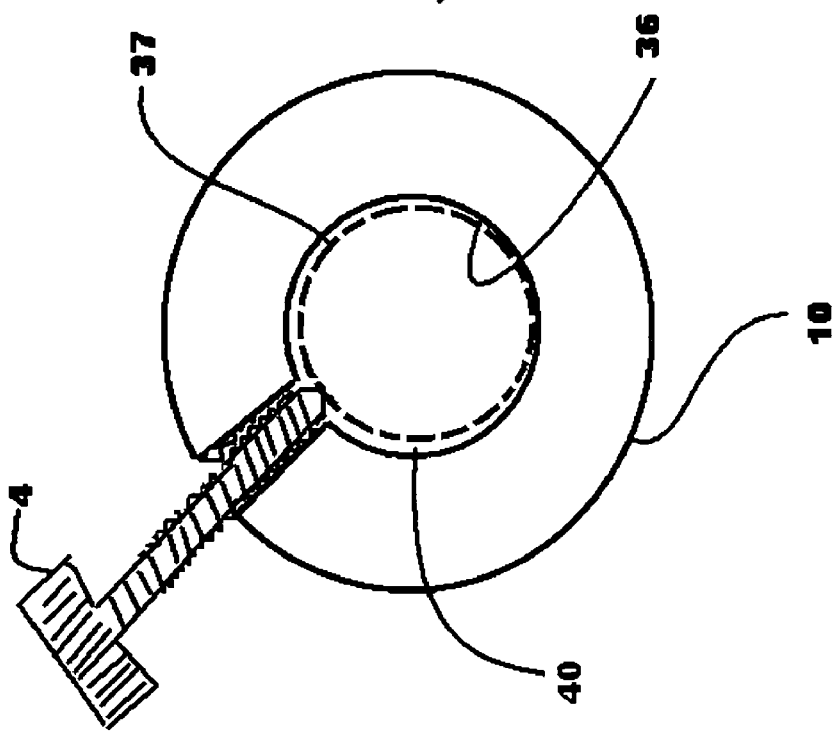
FIG. 6 is a top sectional view of an alignment apparatus according to an embodiment of the invention.

The "x", "y", and tilt positions of an optical connector 37 may be secured using the same retaining device which was used to secure the alignment port 26, so that the optical connector is forced and maintained against the same surface 36 so that it is in contact with the surface of the housing and into substantially the same position with a portion of the optical connector in contact with the surface along the length of the of the ferrule. In an example embodiment the opening at the distal end 40 for the alignment port or an optical connector is round and may be wider than the diameter of the optical connector 37 or alignment port 26. The shape of the opening at the distal end 40 may be round as shown in FIG. 6, alternatively it may be square as shown in FIG. 7. The opening at the distal end 40 may be one of many different shapes. A portion of the opening at the distal end 40 may be shaped as a circle or other shape with the remainder of the opening being a different shape.

The optical connector 37 may be a ferrule based optical connector which is connected to a fiber optic cable 41 with sheath 42 and an optical fiber 43. The optical connector 37 may have a longitudinal axis 32-32. The optical connector 37 may have an exterior circumference, and the opening of the housing at the distal end 40, may be larger than the exterior circumference of the optical connector so that the optical connector may be inserted into the opening at the distal end 40.

In an example embodiment one type of fiber optic ferrule is used in the sub assembly alignment port 26. That ferrule, as mentioned earlier, is a stainless steel ferrule. As indicated in the drawings and descriptions, a stainless steel ferrule utilizes both less intense reflected and more intense imaged light being emitted out the top of alignment port 26 and onto viewing area 16. The interior diameter of the stainless steel ferrule is greater than the aperture 19 allowing the emitted light to expand as it travels from bottom to top of the ferrule. Also, the interior sides of the stainless steel ferrule have shiny surfaces promoting the passage of reflected light. Standard stainless steel ferrules have typical apertures 19 at the insertion end of 125 microns diameter to 230 micron diameters. Sizes in this range have been employed successfully.

In the example embodiment the method of aligning the light source 9 may include having some of the light emitted by the laser through the focusing lens 3, which is reflected off the interior sides of the ferrule and the more intense portion is imaged onto the viewing area 16. The reflected light may appear as a circular halo of light and the more intense light may appear as a roughly circular intense area inside the halo of reflected light. It is likely that when the alignment procedure begins that only the dimmer halo of reflected light is visible on the viewing area 16. A small amount of random tilting of the housing 10 and the more intense region of visible light will become apparent. Once the more intense imaged light is centered within the halo of reflected light and the housing 10 is stabilized relative to the laser diode 9 using a stabilizer such as the stabilizing ring 13, the alignment process is complete. While the discussion of reflected and more intense imaged light may be instructive, the accuracy of that discussion or the inventor's theoretical conclusions and details are not essential to the use or operation of the invention.

One part of the process according to an example method is to set the adjustable retainer 1 at the proper distance from the insertion end of the ferrule. This distance may be determined by the focal point of the GRIN or other lens utilized. The adjustable retainer 1 then only allows the ferrule to enter the housing 10 to a certain distance and that distance should be at or near the focal point of the GRIN lens. During the alignment process then one of the first steps is to insert a properly adjusted alignment port 26 into the housing 10 and the retaining device 4, for example a thumb screw, is tightened down forcing the ferrule portion of alignment port 26 against the opposite side of ferrule cavity 6, to releasably retain the optical connector in contact with the surface 36. The ferrule cavity 6 of the current example may alternatively be a section for a optical connector, and does not need to be a cavity as in the current example.

Once removed, the first portion of the alignment port 34 reseats itself in a very repeatable fashion each time it is reinserted. Since most ferrules are manufactured to very exact tolerances the alignment port 26 can be removed from the housing 10 and any optical connector using a ferrule of like outer dimension can be substituted in its place with little or no measurable loss of optical power. This allows several different optical connectors of different design to be used interchangeably with the same module represented in FIG. 2. The retaining device 4 may also allow the ferrule portion of an optical connector to be moved out of its optimum position for the "z" direction or focal point so that an infinite amount of optical power attenuation can be found without any significant change in the "x" "y" or tilt position of the optical connector in relation to the lens.

In an example embodiment the electrical connectors 12 of the light source 9, which in this example is a laser diode, once plugged into the electrical sockets 11 of the main fixture 15, are generally sufficient to hold the diode in place while the housing 10 is being manipulated. Other mechanical or support means may be used to reinforce the stability of light source 9. Once the more intense light has been manipulated to the center of the less intense halo of reflected light, as demonstrated in FIG. 4 Result 25, the alignment process is complete.

While any number of mechanical means could be designed to hold housing 10 in place relative to the light source 9 an adhesive means has been found to be effective when using a laser diode as a light source. Should the adhesive method be utilized, stabilizing ring 13 may hold the housing 10 in place during the curing of the adhesive after alignment is achieved. Any number of different adhesives may be used including those with thermal conductivity. Any number of alternative methods could be used to hold the housing 10 in place while the adhesive cures. The stabilizing ring 13 could simply have enough mass to hold the housing 10 in place or some other means such as magnets or fasteners may be employed.

In an example embodiment a main fixture 15 is shown. The main fixture 15 depicted in FIG. 3 could be constructed of many different materials but plastic or metal would be suitable. The viewing area 16 may be made from any of many different materials and may be a translucent window such as translucent plastic or tracing paper. The emitted light could also be transmitted to a different point using a mirror or some camera arrangement or simply projected onto some solid surface as a viewing area 16. FIG. 3 shows a single module as depicted in FIGS. 1 and 2 but a plurality of modules could be fitted on a single main fixture 15. As mentioned earlier, the laser control box 14 could be integrated into the main fixture 15. The main fixture 15 may have one or more electrical sockets 11 for inserting the electrical connectors 12 of a laser diode or other light source. The electrical sockets 11 may hold the light source 9 while the housing 10 is manipulated and aligned, and provide electrical power for the light source 9, so that light is transmitted into the housing 10 and passes through the lens 3 (if used) and through the aperture 19 in the alignment port 26. The electrical sockets may temporarily hold the light source 9 so that once the light source 9 is affixed to the housing 10, both may be removed together and used in other applications.

While there has been discussion of using GRIN lenses with this invention many different focusing or collimating lenses may be used including aspheric lenses and the housing 10 may be designed to accommodate those lenses of different design, or designed specifically for a specific type of lens. It is also feasible to use no focusing or collimating lens at all. In an example embodiment the housing 10 may be made without a lens and the laser diode may be aligned to the alignment port 26. The laser diode 9 is then secured to the housing, and the alignment port is removed.

Alternatively a fiber bundle containing a plurality of fibers may be affixed within the alignment port 26, with the end of the fiber bundle at the aperture 19, or alternatively with the end of the fiber bundle within a reflective chamber 27. The fiber bundle can preserve the integrity of the optical image as the light passes through the fiber bundle. A display device could be connected to the end of the fiber bundle and displayed on a viewing area. The viewing area could be any display device which displays an image from a fiber bundle. In this manner the light projected into the aperture 19 in the alignment port 26 containing a fiber bundle may be visible on a viewing area through the fiber bundle. For example, the optical fiber 43 may be a fiber bundle, and may be used as an alignment port 26.

Another embodiment includes affixing a single or multimode optical fiber in the alignment port 26 so that the intensity of the light passing through the fiber may be observed on a viewing area. Another embodiment would include affixing a window or lens within the alignment port 26 so that the intensity of the light might be observed on a viewing area or the relationship of more intense light to less intense light might be observed on a viewing area. Another embodiment includes affixing a viewing area or transmission means directly to the alignment port 26 so that the degree of optical alignment may be viewed either directly or remotely. In another alternative embodiment, a light source may be used with a lens that is affixed to the light source.

The alignment port may be assembled from already manufactured parts as in ferrule 2 and adjustable retainer 1. Alternatively, these parts could be designed and fabricated in one piece or separately and used specifically for the purpose of this invention. Other structures may be used to form an alignment port. As discussed earlier, light sources and laser diodes outside of the visible wavelengths may be utilized by using an external device capable of detecting alignment information and then displaying that information in some visible format. One example of this is to use a video camera capable of displaying images in the infrared range. The camera is simply switched to infrared mode and then trained on the viewing area 16. The camera's display or remote display would then indicate the state of alignment to the operator or technician.

While the example method of alignment has been generally described above as moving or tilting the housing 10 relative to the fixed position of the light source 9, with the alignment port 26 and lens 3 affixed in the housing, alternative embodiments may include moving or tilting any one or a plurality of the optical components to positions relative to each other so that light projected from the light source 9 was caused to be projected through the alignment port 26 and onto a viewing area. Once alignment was achieved, those optical or mechanical components not previously secured prior to or during the alignment process could be permanently affixed by adhesive or other mechanical means. Optical components may include a light source, a laser diode, one lens or multiple lens components, an alignment port with an aperture, mirrors, reflective surfaces, windows, prisms and other components useful as optical components.

For example an alternative embodiment would include moving or tilting the lens 3 within a lens cavity 7 designed to allow said movement. The light source 9, in this embodiment, might first be firmly affixed to the housing 10 and then the lens 3 position manipulated in an "x" "y" direction or tilt position, relative to the light source 9 and housing 10, by mechanical adjustment or other means to accomplish alignment. Once alignment was achieved the lens 3 might be permanently affixed by adhesive or other mechanical means.

While the principles of the invention have been made clear in illustrative embodiments, there will be immediately obvious to those skilled in the art many modifications of structure, arrangement, proportions, and methods, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

I claim:

1. An apparatus for coupling a laser diode to a fiber optic cable comprising:
   (a) a housing;
   (b) a focusing lens;
   (c) a retaining device;
   (d) a laser diode;
      (i) the housing having an opening at a distal end for receiving an optical connector, and an opening at a proximal end for receiving and retaining the laser diode, the housing having a lens cavity for securing the focusing lens to the housing between the proximal end and the distal end, with the lens cavity connecting the opening at the distal end and the opening at the proximal end so that light may pass from the proximal end to the distal end;
      (ii) the housing having a surface, and the retaining device operating to maintain the optical connector against the surface of the housing such that a portion of the optical connector along a length is in contact with the surface of the housing, the retaining device releasably retaining the optical connector in contact with the surface of the housing;
      (iii) the opening at the distal end being larger than an exterior circumference of the optical connector; and
   (e) a removable alignment port, said alignment port having a first outer portion with a circumference approximately the same as the circumference of the optical connector, and the alignment port having a second outer portion having a dimension larger than at least a portion of the width of the opening at the distal end of the housing, said alignment port having an aperture at a first end, said distal end of the housing receiving the first end of the alignment port, the retaining device operating to maintain the first end of the alignment port against the surface of the housing such that a portion of the first end of the alignment port along a length is in contact with the surface of the housing, the retaining device releasably retaining the first end of the alignment port in contact with the surface of the housing said second outer portion of the alignment port contacting a portion of the housing.

2. An apparatus for coupling a laser diode to a fiber optic cable according to claim 1 wherein the opening at the proximal end allows adjustment of the laser diode in a relative tilt between the focusing lens and the laser diode before the laser diode is secured to the housing.

3. An apparatus for coupling a laser diode to a fiber optic cable according to claim 1 wherein the lens cavity allows adjustment of the focusing lens in a relative tilt, relative to the laser diode before the focusing lens is secured to the housing.

4. An apparatus according to claim 1 wherein the second outer portion of the alignment port is positioned on the alignment port such that the aperture is positioned approximately at a focal point of the focusing lens.

5. An apparatus according to claim 1, further comprising a viewing area, said viewing area being positioned so that light from the laser diode passing through the lens in the housing and through the aperture at the first end of the alignment port is visible on the viewing area.

6. An apparatus according to claim 1, wherein the retaining device has a threaded portion, and wherein the housing has a threaded opening for receiving the threaded portion of the retaining device.

7. A method of aligning a laser diode for use with a fiber optic cable comprising the steps of:
   (a) providing a housing with a first section for a laser diode, and a second section for an optical connector and a third section for securing a lens;
   (b) providing an alignment port with an aperture, the alignment port being configured to fit into the second section for the optical connector;
   (c) securing the lens into the housing in the third section for securing the lens;
   (d) placing the laser diode in the first section for the laser diode which is proximate to the lens;
   (e) inserting at least a portion of the alignment port into the housing in the second section for the optical connector;
   (f) providing electrical power to the laser diode to activate the laser diode so that the laser diode emits light into the lens;
   (g) projecting light from the laser diode through the aperture in the alignment port to be viewed on a viewing area;
   (h) adjusting a relative tilt between the housing and the laser diode to align the laser diode with the aperture of the alignment port to achieve a predetermined configuration of the projected light on the viewing area;
   (i) securing the laser diode to the housing to secure the relative tilt between the housing and the laser diode; and
   (j) removing the alignment port from the housing.

8. A method of aligning a laser diode according to claim 7 wherein the predetermined configuration of the projected light is an image of intense light with the intense light concentrically aligned in the projected light.

9. A method of aligning a laser diode according to claim 7 wherein the housing includes a device for removably securing the alignment port or the optical connector in the housing.

10. A method according to claim 9 wherein the device for removably securing the alignment port or the optical connector in the housing is configured to maintain the alignment port or the optical connector against a surface of the housing.

11. A method of aligning a laser diode according to claim 7 wherein the aperture in the alignment port is positioned approximately at a focal point of the lens.

12. A method of aligning a laser diode according to claim 7 wherein the laser diode is secured using a stabilizer and adhesive.

13. A method of aligning a laser diode according to claim 7 further comprising the steps of inserting the optical connector into the housing in the second section for the optical connector and securing the optical connector to the housing.

14. A method of aligning a laser diode according to claim 7 wherein the step of adjusting the relative tilt between the housing and the laser diode is performed by tilting the housing by hand.

15. A method of aligning a laser diode according to claim 14 wherein the adjustment is also performed by viewing the image on the viewing area to determine when the laser diode is properly aligned.

16. A method of aligning a light source to an optical connector comprising:
- (a) providing a housing with a lens, the lens having a focal point;
- (b) providing a light source to transmit light into the housing and through the lens;
- (c) providing an alignment port having an aperture, and having a reflective chamber with a cross section which is larger than a cross section of the aperture, the alignment port having a longitudinal axis, the cross section of the reflective chamber and the cross section of the aperture being perpendicular to the longitudinal axis of the alignment port;
- (d) securing the alignment port with the aperture approximately at the focal point of the lens;
- (e) emitting light from the light source through the aperture and onto a viewing area such that a first visible image is projected onto the viewing area, and such that a second visible image is projected onto the viewing area;
- (f) adjusting a relative tilt between the light source and the housing so that the first visible image is substantially centered in the second visible image as viewed on the viewing area;
- (g) securing the light source relative to the housing.

17. A method of aligning a light source to an optical connector according to claim 16 further comprising the steps of removing the alignment port and securing an optical connector such that the optical connector is in a position with a longitudinal axis positioned in substantially the same position as the longitudinal axis defined by the previously secured alignment port.

18. A method according to claim 16 wherein the viewing area is translucent such that the first visible image and the second visible image projected on to the viewing area can be viewed on an opposite side of the viewing area.

19. A method according to claim 16 wherein the step of adjusting the relative tilt between the light source and the housing is performed by moving the position of the housing by hand.

20. A housing with a laser diode produced by the process comprising the steps of:
- (a) providing a housing with a first section for a laser diode, and a second section for an optical connector;
- (b) providing an alignment port with an aperture, the alignment port being configured to fit into the second section for the optical connector;
- (c) placing the laser diode in the first section for the laser diode;
- (d) inserting at least a portion of the alignment port into the housing in the second section for the optical connector;
- (e) providing electrical power to the laser diode to activate the laser diode;
- (f) projecting light from the laser diode through the aperture in the alignment port to be viewed on a viewing area;
- (g) adjusting a relative tilt between the housing and the laser diode to achieve a predetermined configuration of the projected light on the viewing area;
- (h) securing the laser diode to the housing to secure the relative tilt between the housing and the laser diode; and
- (i) removing the alignment port from the housing.

21. A housing with a laser diode and a lens produced by the process according to claim 20 wherein the step of adjusting the relative tilt is performed by tilting the housing, while the laser diode is in a temporarily secured position relative to the viewing area.

22. A method of aligning a laser diode for use with a fiber optic cable comprising the steps of:
- (a) providing a housing with a first section for a light source, and a second section for an optical connector and a third section for a lens;
- (b) providing optical components including an alignment port, the lens, the light source and the alignment port having an aperture and being configured to fit into the second section for the optical connector;
- (c) placing the lens into the housing in the third section;
- (d) placing the light source in the first section for the light source which is proximate to the lens;
- (e) inserting at least a portion of the alignment port into the housing in the second section for the optical connector;
- (f) providing electrical power to the light source to activate the light source so that the light source emits light into the lens; and
- (g) adjusting a position or angle of at least one of the optical components relative to each other so that the light is projected into the aperture of the alignment port and is visible on a viewing area with the projected light being visually indicative of the quantity of light passing through the aperture of the alignment port, with alignment indicated by an image of intense light concentrically aligned in the projected light.

* * * * *